United States Patent

[11] 3,583,529

[72] Inventor James D. Robinson
    Nuneaton, England
[21] Appl. No. 864,444
[22] Filed Oct. 7, 1969
[45] Patented June 8, 1971
[73] Assignee Massey-Ferguson Services N.V.
    Curacao, Netherlands
[32] Priority Oct. 22, 1968
[33] Great Britain
[31] 50065/68

[54] SPREADING TYPE MULTIPLE DISC BRAKE
    2 Claims, 3 Drawing Figs.
[52] U.S. Cl. ................................................. 188/71.4,
    188/72.2
[51] Int. Cl. ............................................. F16d 55/16
[50] Field of Search .......................................... 188/71.3,
    71.4, 72.2, 72.7; 192/70

[56] References Cited
    UNITED STATES PATENTS
2,650,796 9/1953 Abraham .................... 188/71.4X
3,101,813 8/1963 Parrett ........................ 188/71.4

Primary Examiner—George E. A. Halvosa
Attorney—Gerhardt, Greenlee and Farris

ABSTRACT: A multiple disc brake has a pair of relatively rotatable pressure plates mounted in the brake housing, an actuator for relatively rotating the pressure plates, and ball ramp cams for separating the plates upon relative rotation. Brake discs are attached to an axle shaft extending through the housing and interposed between the pressure plates and the housing. A servo disc rotatably fixed to each of the pressure plates is interleaved with the brake discs. Upon actuation of the brake, the pressure plates squeeze the brake and servo discs together against the housing, causing rotation of the pressure plates until one of them and its servo disc abut a stop, causing further relative rotation of the pressure plates. The servo discs provide additional frictional surfaces for enhancing servo action. Additionally, a stator disc is interposed between a pair of the brake discs and is attached to the brake housing to provide an additional braking surface.

Inventor
JAMES D. ROBINSON
BY
Gerhardt, Greenlee & Farris
Attorneys

Inventor
JAMES D. ROBINSON
BY
Gerhardt, Greenlee & Farris
Attorneys

SPREADING TYPE MULTIPLE DISC BRAKE

This invention relates to multiple disc brakes. Disc brakes are known in which the surfaces of relatively stationary and rotary discs are brought into frictional engagement by axial separation of a pair of cooperating pressure plates through a cam mechanism located intermediate the plates. Generally, the cam mechanism is in the form of balls operating in conjunction with complementary ramps in the adjacent surfaces of the plates. Axial separation of the plates is accomplished by providing means for initiating angular movement of the pressure plates relative to each other in order to bring the friction surfaces into frictional engagement; both pressure plates then being carried round by the rotating surfaces until one plate is arrested by abutment with a stop on the brake housing. Continued relative angular movement of the plates, assisted by the frictional drag on one plate causes further axial separation and increased application of the brake. By appropriate design of the cam mechanism, it can be arranged for the brake to give itself any required amount of self or servo assistance up to the point where the brake jams itself in a braking state.

For convenience, such brakes will hereinafter be referred to as "brakes of the type aforesaid."

One disadvantages of brakes of the type aforesaid is that they are usually totally enclosed, and reliance is placed on the surrounding structure to dissipate the majority of the heat produced during braking.

It is known to immerse such brakes in liquid in order to provide a fluid mass to facilitate heat dissipation. However, the presence of such liquid reduces the efficiency of the brake as compared with its performance in the dry state. Thus, in order to obtain optimum performance of the brake, it is necessary to increase the pressure developed between the frictional surfaces, for example, by making the ramp angle shallower, so that the servo effect will be increased. However, this has the disadvantage of increasing the movement required by the means for initiating angular movement of the plates and may, thus, take the movement required to apply the brakes beyond ergonomic limits or beyond other confining conditions associated with a vehicle to which the brake is fitted.

An object of the present invention is to obviate or mitigate the above disadvantages.

According to the present invention there is provided in a brake of the type aforesaid, an auxiliary rotary disc, and a servo disc intermediate said auxiliary rotary disc and one of said rotary discs, said servo disc being connected to one of said pressure plates, and said connection allowing axial movement of the servo disc relative to said one pressure plate while preventing relative angular movement therebetween.

Preferably, said connection includes a pin rigidly secured to the periphery of said plate and extending parallel to the brake axis, and a lug on the periphery of the servo disc having an aperture through which said pin is slidable.

Preferably also, the brake includes a further auxiliary rotary disc and a stator disc intermediate said auxiliary discs, said stator disc being connected to the brake housing so as to allow axial movement of the stator disc relative to the one pressure plate while preventing rotation of the stator disc relative to the brake housing.

An embodiment of the invention will now be described, by way of example, with reference to the accompanying drawings in which.

Figure 1:
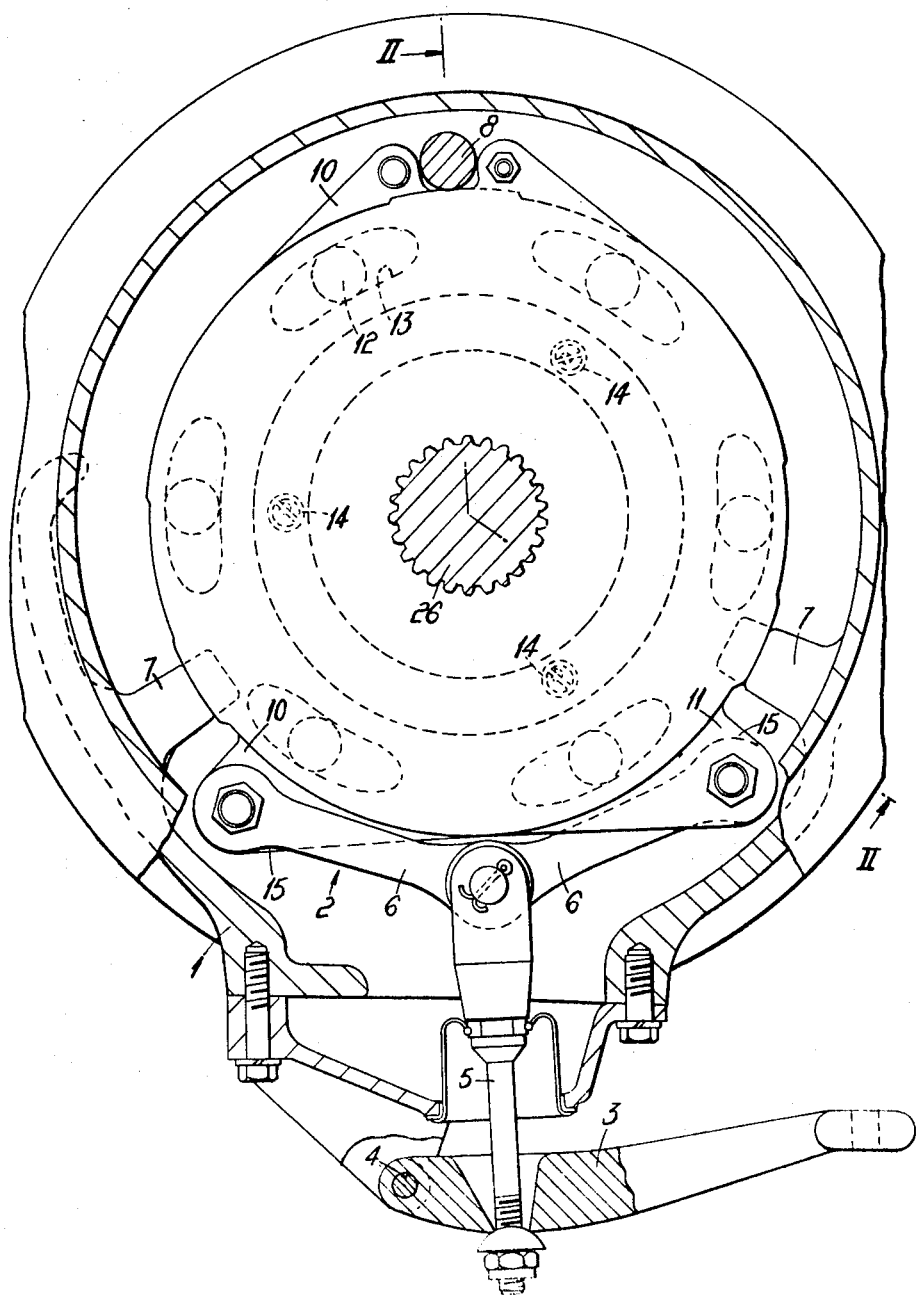
FIG. 1 is a cross-sectional view through a brake according to the present invention taken on the line I–I of FIG. 2.

Referring to the drawings FIG. 1 shows a brake housing 1 enclosing a brake assembly 2 within the brake chamber. Actuation of the brake is achieved by operation of a lever 3 pivotally mounted on the housing 1 through a pivot 4 and connected by an adjustable rod 5 to a pair of links 6. A pair of lugs 7 on the inner periphery of the housing 1, and a pin 8 engaging holes in the housing 1, locate the brake assembly 2 within the housing 1.

The brake assembly 2 includes a pair of pressure plates 10 and 11, and a plurality of rotatable brake discs and a plurality of fixed brake discs. The pressure plates 10 and 11 are generally circular and are in face-to-face relationship with each other, the adjacent faces being separated by steel balls 12 contained in arcuate depressions or recesses in the plates, the bottom surfaces of said depressions or recesses forming ramps 13. Tension springs 14 bias the two pressure plates 10 and 11 together and trap the balls 12 therebetween while permitting the pressure plates 10, 11 to move angularly relative to each other, and hence axially relative to each other, by virtue of the movement of the balls 12 up the ramps 13. The relative angular movement of the pressure plates 10, 11 is generated by operating the rod 5 through the lever 3 and causing the links 6, which are pin connected to a lug 15 on each plate 10 and 11, to move together, thereby rotating the plates 10 and 11 in opposite directions.

Figure 2:
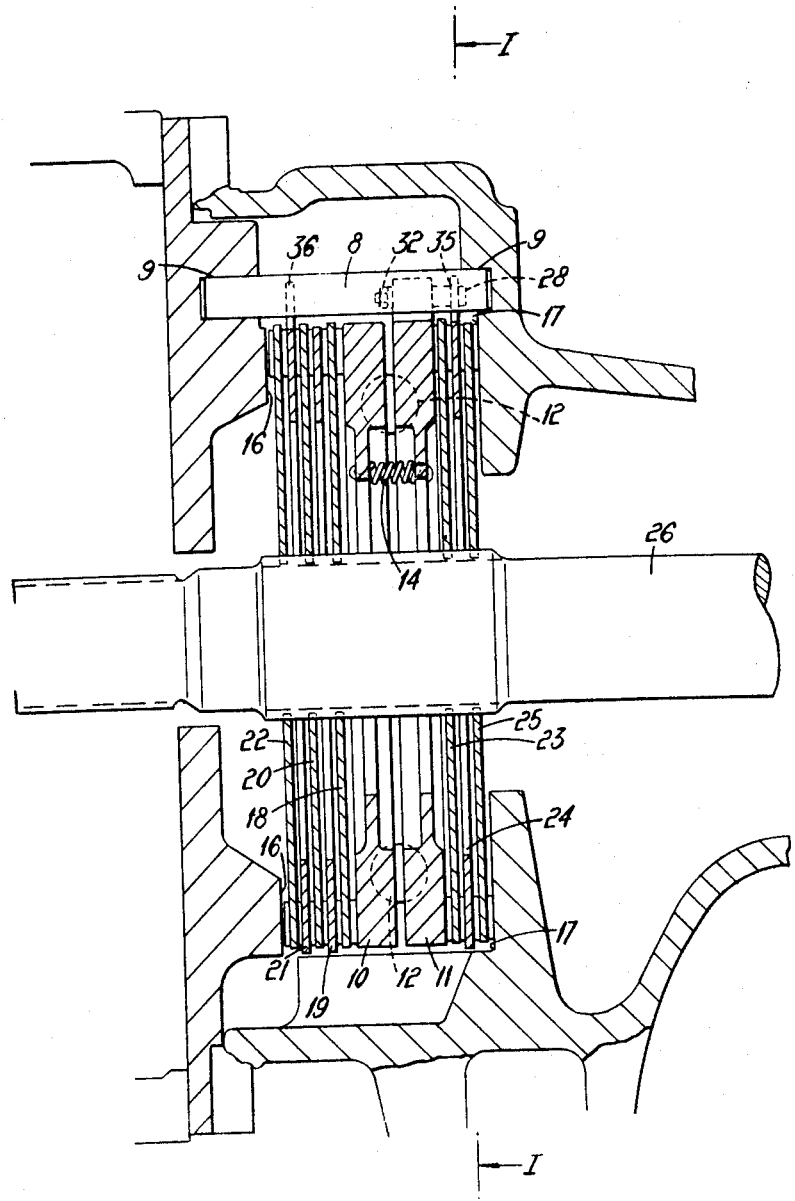
FIG. 2 is a cross section view taken on the line II–II of FIG. 1.
Figure 3:
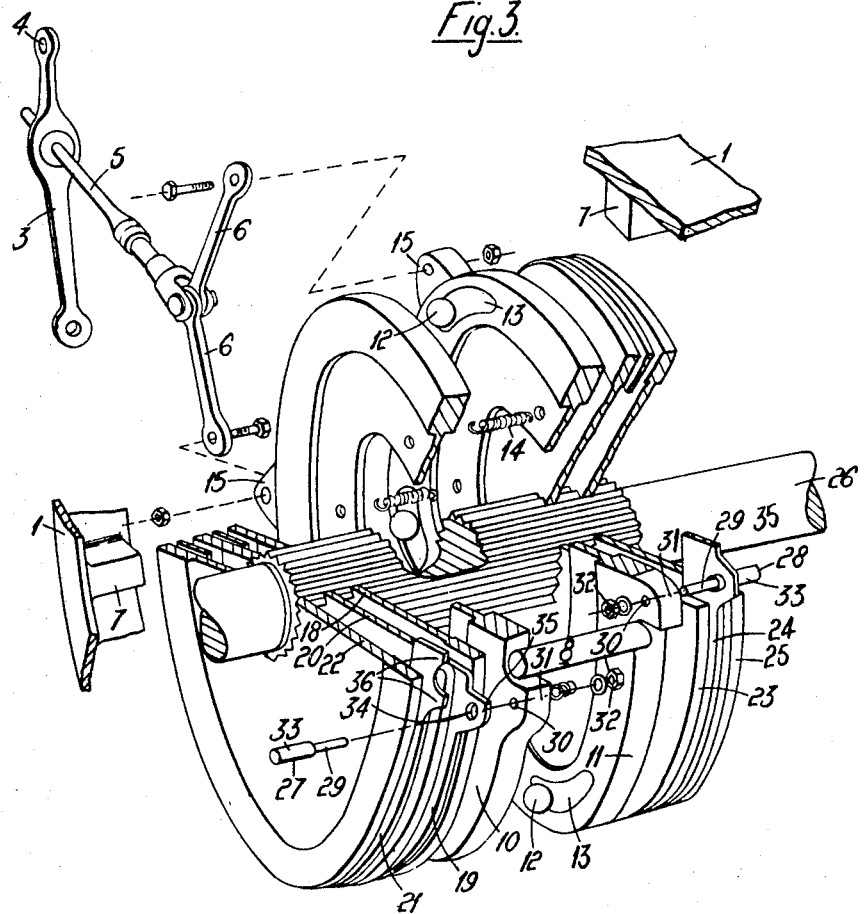
FIG. 3 is an "exploded" perspective view of the brake shown in FIGS. 1 and 2, and having parts cut away for clarity and to illustrate details.

The walls of the housing 1 form stationary braking discs 16 and 17 which cooperate with other brakes discs as will now be explained. To the left (in FIG. 2) of the cam mechanism 12, 13 there is provided, sequentially, the pressure plate 10, a rotary disc 18, a servo disc 19, an auxiliary rotary disc 20, a stator disc 21 and a further auxiliary rotary disc 22. To the right there is provided, sequentially, the pressure plate 11, a rotary disc 23, a servo disc 24 and an auxiliary rotary disc 25.

Each of the rotary discs 18, 20, 22, 23 and 25 are provided on both sides with an annular facing of friction material and each is splined to a drive shaft 26.

The servo discs 19 and 24 are connected to the pressure plates 10 and 11, respectively, by pins 27 and 28, respectively. The pins 27 and 28 are fixed to the pressure plates 10 and 11 by a stepped threaded portion 29 which passes through a hole 30 in a lug 31 on the respective pressure plate and is retained by a nut 32. The shank portion 33 of the pins 27 and 28 passes freely but closely through a hole 34 in a lug 35 on the respective servo disc with the result that the pressure plate and its associated servo disc can move axially, but not angularly, relative to each other. The stator disc 21 has a pair of lugs 36 which embrace the pin 8 and thereby prevent rotation of the stator disc 21 relative to the housing 1.

In operation the lever 3 is moved by a foot pedal (not shown) in order to place the rod 5 in tension and cause the links 6 to move towards one another thereby drawing the lugs 15 towards one another and spreading the pressure plates 10, 11 apart axially as already described. Such axial movement of the pressure plates 10, 11 causes the rotary discs 18, 20, 22, 23, and 25 to be engaged by the adjacent surfaces of the pressure plates 10 and 11, the servo discs 19 and 24 and the stator disc 21 as appropriate, and to rotate the pressure plates 10 and 11 and the servo discs 19 and 24 until the lugs 31 and 35 on the plate 10 and the servo disc 19 abut the pin 8. The plate 11 and the servo disc 24 continue to be urged around angularly by their frictional contact with the rotary discs 23 and 25 and thereby spread the pressure plates 10 and 11 even further apart.

In the arrangement according to the invention, three interfaces act to urge the pressure plate 11 around thereby increasing the axial separation forces and braking forces. The interfaces are:

a. Between the pressure plates 11 and the rotary disc 23,
b. Between the servo disc 24 and rotary disc 23, and
c. Between the servo disc 24 and the auxiliary rotary disc 25.

The pin 28 in providing a reaction transmits the braking forces on the disc 24 to the plate 11 and urges it around thus increasing the axial separation of the pressure plates.

Thus, by choosing a steep ramp angle and using the three arrangement of discs described above, it is possible to provide a brake having the same performance as a brake having only one "servo" braking interface and a shallower ramp angle. A steeper ramp angle has two main advantages, namely the pedal travel required to actuate the lever 3 does not need to be unduly long and the springs 14 pull the pressure plates 10 and 11 together more efficiently thereby reducing brake drag when the brakes are not being applied.

It will be apparent that when the shaft 26 is rotating in the reverse direction the roles of the pressure plates 10 and 11 and the servo discs 19 and 24 will be reversed so that braking in both directions is equally effective.

The stator disc 21 has been described and illustrated to show that it is possible to change the capacity of the brake by the addition of discs such as disc 21. Such additional discs provide extra braking surface for absorption of energy and, if the brake is liquid cooled, provided extra heat paths for conducting heat away to the cooling medium.

While the invention has been described entirely with reference to disc brakes it will be appreciated that the invention is equally applicable to multidisc clutches.

I claim:

1. A multiple disc brake comprising: a brake housing having spaced braking surfaces in a chamber, a pair of pressure plates mounted together in the chamber and each having a braking surface facing a housing surface, actuator means for rotating the pressure plates relative to each other, cam means mounted between the pressure plates for forcing the pressure plates apart and toward the housing surfaces upon relative rotation, a shaft extending through the chamber and rotatable relative to the chamber and the pressure plates, a pair of brake discs interposed between each pressure plate and its adjacent housing surface, the discs being rotatably fixed to the shaft and axially movable relative thereto, a servo disc interposed between each pair of brake discs and being rotatably fixed to and axially movable relative to the pressure plates, and stop means mounted on the brake housing and engageable with one of the pressure plates for limiting the rotation thereof, the cam means effecting axial separation of the pressure plates upon relative rotation thereof to frictionally interengage the brake discs with the housing surfaces, the pressure plate surfaces and the servo discs to retard relative rotation of the shaft and the brake housing, the frictional engagement of the brake discs with the servo discs enhancing relative rotation and axial separation of the pressure plates upon engagement of the one pressure plate with the stop means to increasingly retard the relative rotation of the shaft and the brake housing.

2. The multiple disc brake of claim 1, including: a stator disc interposed between one of the brake discs and one of the housing surfaces and being rotatably fixed to and axially movable relative to the brake housing and a further brake disc mounted on the shaft for rotation therewith and axial movement relative thereto interposed between the stator disc and the housing surface, interengagement of the stator disc and the further brake disc providing additional frictional forces for retarding relative rotation of the shaft and the brake housing.